(12) United States Patent
Rahm et al.

(10) Patent No.: US 11,821,377 B2
(45) Date of Patent: Nov. 21, 2023

(54) METHOD FOR OPERATING AN INTERNAL COMBUSTION ENGINE SYSTEM

(71) Applicant: VOLVO TRUCK CORPORATION, Gothenburg (SE)

(72) Inventors: Fredrik Rahm, Hörby (SE); Martin Bauer, Anderslöv (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/635,744

(22) PCT Filed: Aug. 20, 2019

(86) PCT No.: PCT/EP2019/072297
§ 371 (c)(1),
(2) Date: Feb. 16, 2022

(87) PCT Pub. No.: WO2021/032291
PCT Pub. Date: Feb. 25, 2021

(65) Prior Publication Data
US 2022/0307433 A1 Sep. 29, 2022

(51) Int. Cl.
*F02D 41/00* (2006.01)
*F02M 26/05* (2016.01)
(Continued)

(52) U.S. Cl.
CPC .......... *F02D 41/0007* (2013.01); *F02B 33/38* (2013.01); *F02B 37/18* (2013.01);
(Continued)

(58) Field of Classification Search
CPC ....... F02D 17/02; F02D 41/0087; F02B 37/18
See application file for complete search history.

(56) References Cited

U.S. PATENT DOCUMENTS

| 8,631,646 B2 | 1/2014 | Smith et al. |
| 2011/0146269 A1 | 6/2011 | Hepburn et al. |

(Continued)

FOREIGN PATENT DOCUMENTS

| CN | 202073649 U | 12/2011 |
| CN | 107781027 A | 3/2018 |

(Continued)

OTHER PUBLICATIONS

International Search Report and Written Opinion of the International Searching Authority, PCT/EP2019/072297/072297, dated May 14, 2020, 20 pages.

(Continued)

*Primary Examiner* — Ngoc T Nguyen
(74) *Attorney, Agent, or Firm* — Sage Patent Group (57) ABSTRACT

Provided are methods for operating an internal combustion engine system including: an internal combustion engine provided with a plurality of cylinders, each of which being provided with an air inlet valve and an exhaust gas valve; a fuel supply system configured to supply fuel to the cylinders; an air intake system and an exhaust gas system; a turbocharging arrangement comprising an intake air compressor arranged in the air intake system and an exhaust gas turbine arranged in the exhaust gas system, wherein the intake air compressor is operatively connected to the exhaust gas turbine; a controllable gas feeding device arranged in the air intake system downstream the intake air compressor; an exhaust gas aftertreatment system arranged downstream the exhaust gas turbine; and a wastegate.

25 Claims, 4 Drawing Sheets

(51) Int. Cl.
F02B 33/38 (2006.01)
F02B 37/18 (2006.01)
(52) U.S. Cl.
CPC ......... *F02D 41/0087* (2013.01); *F02M 26/05* (2016.02); *F02D 2200/0802* (2013.01)

(56) References Cited

U.S. PATENT DOCUMENTS

| | | | |
|---|---|---|---|
| 2011/0265453 A1* | 11/2011 | Uhrich | F02D 17/02 60/276 |
| 2015/0204279 A1 | 7/2015 | Kemmerling et al. | |
| 2015/0315960 A1 | 11/2015 | Thomas et al. | |
| 2017/0030257 A1 | 2/2017 | Wu et al. | |
| 2018/0010533 A1 | 1/2018 | Yu et al. | |
| 2018/0058289 A1 | 3/2018 | Lee et al. | |
| 2018/0223757 A1 | 8/2018 | McCarthy et al. | |

FOREIGN PATENT DOCUMENTS

| | | |
|---|---|---|
| DE | 102006058150 A1 | 6/2008 |
| DE | 102007009161 A1 | 9/2008 |
| FR | 3058472 A1 | 5/2018 |
| JP | 2009191686 A | 8/2009 |

OTHER PUBLICATIONS

Chinese Office Action with Summary, Chinese Patent Application for Invention No. 201980099441.2, dated May 9, 2023, 70 pages.

* cited by examiner

METHOD FOR OPERATING AN INTERNAL COMBUSTION ENGINE SYSTEM

CROSS REFERENCE TO RELATED APPLICATIONS

This application is a 35 U.S.C. § 371 national stage application of PCT International Application No. PCT/EP2019/072297 filed on Aug. 20, 2019, the disclosure and content of which is incorporated by reference herein in its entirety.

TECHNICAL FIELD

The invention relates to a method for operating an internal combustion engine system. In particular, the invention relates to a method including cylinder deactivation for quickly increasing the exhaust gas temperature to ensure proper functioning of an exhaust gas aftertreatment system arranged in such an engine system. The invention also relates to an engine system configured to be operated by such a method.

The invention can typically be applied in heavy-duty vehicles, such as trucks, buses and construction equipment. Although the invention will be described with respect to a truck it is not restricted to this particular vehicle but may also be used in other vehicles or vessels and also in stationary applications.

BACKGROUND

There is a general desire for improving internal engine combustion systems with regard to performance, efficiency, exhaust gas aftertreatment, etc. One approach is to provide the engine system with means for deactivation of one or more cylinders where combustion is prevented in deactivated cylinders (by shutting off fuel supply) and where remaining active cylinders can be operated with a higher load. This is useful to decrease fuel consumption in low-load situations where the active cylinders may be operated in a more efficient mode.

Challenges may arise when introducing cylinder deactivation on an engine provided with a turbocharging arrangement, i.e. an arrangement where intake air is compressed by means of a compressor operatively connected to a turbine that is driven by engine exhaust gas, because cylinder deactivation has a significant effect on the flows of intake air and exhaust gas, which in turn has a significant effect on the function of the turbocharging arrangement. For instance, the turbocharger compressor may not be capable of providing a sufficient boost pressure because of a reduced flow of exhaust gas that does not provide a sufficient driving force for the turbocharger turbine. This problem is addressed in US2015/0204279 that discloses an internal combustion engine system where a blower compressor is arranged downstream the turbocharger compressor for providing increased boost during cylinder deactivation.

The combination of turbocharging and cylinder deactivation has an interesting potential for improving internal engine combustion systems and some principles laid down in US2015/0204279 are useful. However, there is a need for further improvements of such engine systems.

SUMMARY

An object of the invention is to provide an internal combustion engine system and a method for operating such a system that, when needed, provides for a quick increase of the exhaust gas temperature to secure efficient functioning of the exhaust gas aftertreatment system. According to a first aspect of the invention, this object is achieved by a method according to claim 1. According to a second aspect of the invention, this object is achieved by an internal combustion engine system according to the corresponding independent claim. Further objects are to provide a vehicle provided with an engine system of the above type and computer-related items related to said method and engine system. These further objects are achieved by the corresponding vehicle and computer-related items claims.

The method provided relates to a method for operating an internal combustion engine system comprising: an internal combustion engine provided with a plurality of cylinders, each of which being provided with an air inlet valve and an exhaust gas valve; a fuel supply system configured to supply fuel to the cylinders; an air intake system and an exhaust gas system; a turbocharging arrangement comprising an intake air compressor arranged in the air intake system and an exhaust gas turbine arranged in the exhaust gas system, wherein the intake air compressor is operatively connected to the exhaust gas turbine; a controllable gas feeding device arranged in the air intake system downstream the intake air compressor; an exhaust gas aftertreatment system arranged downstream the exhaust gas turbine; and a wastegate arranged to allow exhaust gas to bypass the exhaust gas turbine, wherein the internal combustion engine system is configured to allow operational deactivation of one or more cylinders while one or more cylinders are operationally active.

The method comprises the steps of:
determining whether a functional efficiency of the exhaust gas aftertreatment system is or is about to fall below a threshold value, and when so:
deactivating one or more of the cylinders;
adapting a drive level of the gas feeding device so as to establish a pressure in the air intake system that is within a range suitable for operating remaining active cylinders; and
opening the wastegate to such a degree that at least 50% of the exhaust gas bypasses the exhaust gas turbine.

In the first step it is determined whether the functional efficiency of the exhaust gas aftertreatment system (EATS) is or is about to become too low for efficient treatment of the exhaust gas in the EATS. That is, it is determined, directly or indirectly, whether the EATS is or is about to be (indicated by a decreasing functional efficiency) incapable of converting compounds in the exhaust gas, such as hydrocarbons and NOx, to a sufficient degree. As further described below, this may be done by determining the actual performance of the EATS, or of a certain component/catalyst of the EATS, using emission sensors arranged in the EATS. Most EATS are already provided with standard emission sensors suitable for this purpose, such as NOx-sensors and lambda sensors. Alternatively, or as a complement, the functional efficiency of the EATS can be determined from the temperature of the EATS (or of the exhaust gas in the EATS) since a minimum EATS temperature normally is required for proper functioning. Also temperature sensors are typically already included in most EATS. Both calculated and measured temperature and/or emission values may be used in various ways for determining whether the functional efficiency of the EATS is or is about to fall below the threshold value. The exact threshold value may be adapted to the particular engine system and the particular way of determining the EATS functional efficiency.

A too low functional efficiency of the EATS typically relates to cold-start conditions or where a "heat mode" is necessary, for instance after having operated the engine in low-load conditions for some time. The exact threshold temperature to be used if determining the EATS efficiency from the temperature depends on the particular engine system, how the temperature is determined, etc., but as a guideline it may be noted that many EATS components, such as catalytic converters, need to have a temperature of at least around 200-220° C. to function properly.

The steps following the first step have the general effect that the exhaust gas temperature quickly becomes high (so as to quickly increase the EATS functional efficiency) while a high engine efficiency still can be maintained. The method is applicable to both diesel and Otto cycle engines.

The deactivation step allows a fewer number of cylinders to operate with a higher load, which generates exhaust gas with a higher temperature. That a cylinder is deactivated means that no combustion occurs in that cylinder, and combustion is efficiently prevented by preventing supply of fuel to that cylinder. This is preferably combined with preventing air from entering or at least passing through the deactivated cylinder, in particular when the purpose, as in the present case, is to increase the temperature of the exhaust gas in which case it is unsuitable to dilute and cool the hot exhaust gas with cold air that passes through one or more deactivated cylinders. Preventing air from passing through deactivated cylinders can be done by keeping inlet and/or exhaust valves closed, for instance by using a variable valve actuation (VVA) system, or by using another valve upstream the deactivatable cylinder so as to prevent intake air from even reaching the inlet valve of the cylinder. Deactivation of a cylinder in an Otto cycle engine may also include deactivation of the spark plug.

Wastegates are variable valves generally used for diverting some (may be up to 10-20%) of the exhaust gas away from the exhaust gas turbine to regulate backpressure and compressor rotation speed (and boost pressure) in the turbocharging arrangement. In the present invention the wastegate is used to create a considerably large bypass flow of exhaust gas bypassing the exhaust gas turbine, at least 50%, so as to avoid or only slightly decrease the exhaust gas temperature before it enters the EATS, which thereby can be heated quickly. The wastegate may be set so that 100% of the exhaust gas bypasses the exhaust gas turbine. All exhaust gas flows through the EATS before being released from the engine system.

Adapting the drive level of the gas feeding device to the different operational conditions with fewer cylinders in operation provides for a suitable boost pressure even when the turbo compressor cannot provide a sufficient pressure because the driving force from the turbine is too small due to the large exhaust gas bypass flow through the wastegate. Even if the turbo compressor would be driven at a higher speed by another source, such as an electric motor, it would not function as intended anyway, at least not when intake air is prevented from entering and passing through the deactivated cylinders which leads to a reduced flow of intake air. The reason is that the turbo compressor is designed for a larger engine (with all cylinders active) and a larger volume flow, and a too small volume flow of air leads to aerodynamic instabilities (surge) in the compressor. Exactly how to adapt the drive level of the gas feeding device depends on the particular engine system, how many cylinders that are deactivated, the particular components used, (e.g. type of gas feeding device), etc.

An intake air bypass conduit may be arranged to allow intake air to bypass the turbo compressor to avoid damage to the turbo compressor (such as oil leakage) when air is fed to the cylinders primarily by means of the gas feeding device. This is of particular interest if the wastegate flow is large or has been large for some time so that the rotation speed of the turbo compressor is low and if, at the same time, the air flow fed by the gas feeding device is large.

Operation of the engine system may be switched from deactivated mode, where one or more cylinders is deactivated, to normal mode, where all cylinders are active, when the temperature of the EATS has increased and is within a normal interval. However, the deactivated mode may be maintained if it is determined (typically by a control circuitry configured to control operation of the engine system) that the overall engine efficiency can be kept higher with a reduced number of active cylinders. In such a case the wastegate may be closed or kept only slightly open and the drive level of the gas feeding device may be reduced. It is also possible to activate only a portion, for instance one, of the deactivated cylinders at a time so that the engine systems stepwise increases the number of active cylinders.

When switching from deactivated mode with at least one cylinder deactivated, the procedure may be as follows: checking whether the EATS temperature is sufficient; gradually closing the wastegate so as to speed up the turbo compressor; adapting/decreasing drive level for the gas feeding device in response to increasing turbo compressor power; and activating the at least one deactivated cylinder (i.e. starting feeding fuel to the cylinder and e.g. activating inlet and exhaust valves if previously inactivated).

In an embodiment the step of determining whether the functional efficiency of the exhaust gas aftertreatment system is or is about to fall below a threshold value comprises the steps of: receiving a signal indicative of the functional efficiency of the exhaust gas aftertreatment system, and determining whether said signal is or is about to fall below a signal threshold value. As mentioned above, this signal may be obtained from one or more temperature or emission sensors. To determine a rate of change of the EATS functional efficiency (i.e. a rate of change of the temperature or of the actual conversion capability), i.e. to determine whether the functional efficiency is about to fall below the threshold, the temperature or conversion capability can be measured several times during a time period. Sensor signals are received by a control circuitry configured to control the operation of the engine system. Such control circuitries are well known as such.

In an embodiment the step of determining whether the functional efficiency of the exhaust gas aftertreatment system is or is about to fall below a threshold value comprises the step of: determining whether a temperature in the exhaust gas aftertreatment system is or is about to fall below a temperature threshold value; and/or determining whether a degree of exhaust gas conversion in the exhaust gas aftertreatment system is or is about to fall below a conversion threshold value.

In an embodiment the step of determining whether the temperature in the exhaust gas aftertreatment system is or is about to fall below the temperature threshold value comprises the step of: obtaining at least a first signal from a temperature sensor arranged in the exhaust gas system downstream the exhaust gas turbine; and/or calculating a current or expected temperature in the exhaust gas aftertreatment system.

As mentioned above, there is normally already a temperature sensor arranged in the EATS region that can be used, but the temperature sensor(s) used for determining whether the temperature in the exhaust gas aftertreatment system is or is about to fall below the threshold value may alternatively be arranged in the exhaust system upstream or downstream the EATS. The temperature actually measured need not necessarily be the temperature of the EATS but the temperature of the exhaust gas or another component in the exhaust system, and the temperature of the EATS can be estimated or calculated from such an indirect measurement.

As a complement or alternative to measure the temperature with one or more sensors it is possible to calculate a current temperature or an expected temperature (i.e. a likely temperature within a reasonably short time interval) of the EATS. The calculations may be carried out by the control circuitry and may be model based using input such as ambient temperature, temperature of compressed intake air, previous operation modes, emission sensors in the EATS, etc.

In an embodiment the step of determining whether the degree of exhaust gas conversion in the exhaust gas aftertreatment system is or is about to fall below the conversion threshold value comprises the step of: obtaining at least a first signal from an emission sensor arranged in the exhaust gas aftertreatment system or downstream thereof; and/or calculating a current or expected degree of exhaust gas conversion in the exhaust gas aftertreatment system. Examples of useful emission sensors are NOx-sensors for diesel engines and lambda sensors for Otto cycle engines. First and second sensors of the same type may be arranged upstream and downstream of a relevant component of the EATS to allow comparison of the signals and thus determination of the functional efficiency. For instance, first and second lambda sensors may be arranged upstream and downstream of a three-way catalyst and first and second NOx sensors may be arranged upstream and downstream of a catalyst intended to reduce NOx. Contents and conversion of exhaust gas may also be calculated ("virtual sensors") in line with the temperature calculations mentioned above.

In an embodiment the step of deactivating one or more of the cylinders comprises the step of: shutting off the supply of fuel to the one or more cylinders to be deactivated. It is known that, for instance, individual fuel injectors can be controlled this way. Shutting off of fuel supply to a certain cylinder prevents combustion and thus deactivates that cylinder.

In an embodiment the step of deactivating one or more of the cylinders comprises the step of: preventing intake air from flowing through the one or more cylinders to be deactivated. Air/gas will then flow only through the active cylinders. Preferably, this step comprises the step of keeping the inlet and/or exhaust valves of the one or more deactivated cylinders closed. A variable valve actuation system, which is known as such, is preferably used for this purpose. As mentioned above, an alternative to keeping the cylinder valves closed is to prevent the intake air from reaching the inlet valve of the deactivated cylinder(s), which can be arranged with a valve upstream of the deactivatable cylinder (s). The engine may be arranged so that one such valve closes the intake manifold to several deactivatable cylinders (while active cylinders get their air from another intake manifold).

In an embodiment the step of adapting a drive level of the gas feeding device so as to establish a pressure in the air intake system that is within a range suitable for operating remaining active cylinders comprises the step of: adapting a drive level of a drive unit arranged to drive the gas feeding device. The drive unit may be an electric motor or a mechanical connection to a crankshaft of the engine, and to adapt the drive level may be to adapt a rotation speed of the drive unit. Exactly how to adapt the drive level (rotation speed, volume flow, pressure, etc.) depends on type and size of engine, type and size of gas feeding device, etc., but generally it can be said that regulation of the drive unit and the gas feeding device can be carried out using a predicted/desired flow as a function of engine speed and load and/or using a predicted/desired pressure ratio upstream and downstream the gas feeding device.

In an embodiment the step of opening the wastegate to such a degree that at least 50% of the exhaust gas bypasses the exhaust gas turbine is carried out so that at least 70%, preferably at least 90%, of the exhaust gas bypasses the exhaust gas turbine. The larger the portion of exhaust gas bypassed, the smaller the reduction in temperature before it enters the EATS, and the quicker the EATS heats up.

In an embodiment the internal combustion engine system comprises a high pressure EGR system comprising a first EGR conduit configured to allow recirculation of exhaust gas from the exhaust system upstream the exhaust gas turbine to the intake system downstream the gas feeding device and wherein the method comprises the step of: redirecting the EGR flow from the exhaust system to a position in the intake system upstream of the gas feeding device and, preferably, downstream of the turbocharging compressor. It is well known to use EGR systems for decreasing the amounts of NOx produced in the combustion process. During normal operation of the engine system the EGR flow is directed to a position in the air intake system downstream the gas feeding device. When the engine operates in the deactivation mode and the gas feeding device forces intake air towards the cylinders, the pressure of the exhaust gas may be lower than the air pressure downstream the gas feeding device, which prevents exhaust gas (EGR) from flowing of itself from the exhaust system to the intake system downstream the gas feeding device. In this embodiment of the method the EGR is redirected to a position in the intake system upstream of the gas feeding device where the air pressure is lower than downstream the gas feeding device and (in most situations) lower than in the exhaust system. This way recirculation of exhaust gas and thus reduction of NOx production can be maintained also at cold start or during heat mode with deactivated cylinders. The exhaust gas is redirected to a position in the air intake system that preferably, but not necessarily, is located downstream of the turbocharging compressor.

In an embodiment the step of redirecting the EGR flow from the exhaust system to a position in the intake system upstream of the gas feeding device and, preferably, downstream of the turbocharging compressor comprises the step of: controlling one or more valves so as to direct the EGR flow through a second EGR conduit arranged to connect the exhaust gas system, directly or via the first EGR conduit, to the intake system upstream of the gas feeding device and, preferably, downstream of the turbocharging compressor. For instance, the first (ordinary) EGR conduit may branch into a first part forming a downstream portion of the first EGR conduit and a second part forming the second EGR conduit that connects the first EGR conduit with the air intake system at a position upstream of the gas feeding device. In such a case, first and second EGR valves may be arranged in the downstream portion of the first EGR conduit and in the second EGR conduit, respectively, for controlling the EGR flow and selecting which path it should go. Other conduit and valve arrangements are possible.

In an embodiment the gas feeding device is a positive displacement machine, preferably a rotary roots type blower having a pair of rotary members provided with meshing lobes. An alternative may be a screw compressor. The positive displacement machine is preferably configured to displace gas from an inlet to an outlet thereof by trapping a fixed amount of gas and forcing that trapped amount of gas from the inlet to the outlet. Further, the positive displacement machine has preferably a linear dependence between rotation speed (of the rotary members) and volume flow through the machine and the flow curve (flow as a function of speed) passes the origin, i.e. when the rotation speed is zero (i.e. when the rotary members are stationary) there is no flow through the displacement machine (besides some leakage). The flow of exhaust gas through the displacement machine can thus be controlled with high accuracy by controlling the rotation speed of the rotary members and thus by controlling a drive unit (such as an electric motor) connected to the displacement machine. This is in contrast to a regular compressor that is an "open" component that allows through-flow also when standing still (the flow curve does not pass the origin).

When the positive displacement machine is not used for increasing the pressure of the intake air it may be set in an inactive mode where it is allowed to rotate freely with the air passing through ("free-wheeling" or "wind-milling"). Thereby it is not necessary to provide the engine system with additional components in the form of a bypass conduit for allowing intake air to bypass the gas feeding device and a valve for closing that bypass conduit. A free-wheel mechanism may be arranged in a driving connection between the gas feeding device and a drive unit arranged to drive the gas feeding device to allow for such "free-wheeling" or "wind-milling".

In an embodiment where the drive level of the gas feeding device is adapted by adapting the drive level of the drive unit arranged to drive the gas feeding device, the gas feeding device comprises at least one rotary member operatively connected to the drive unit, wherein the step of adapting the drive level of the drive unit comprises controlling a rotational speed of the rotary member.

According to the second aspect of the invention it relates to an internal combustion engine system comprising: an internal combustion engine provided with a plurality of cylinders, each of which being provided with an air inlet valve and an exhaust gas valve; a fuel supply system configured to supply fuel to the cylinders; an air intake system and an exhaust gas system; a turbocharging arrangement comprising an intake air compressor arranged in the air intake system and an exhaust gas turbine arranged in the exhaust gas system, wherein the intake air compressor is operatively connected to the exhaust gas turbine; a controllable gas feeding device arranged in the air intake system downstream the intake air compressor; an exhaust gas aftertreatment system arranged downstream the exhaust gas turbine; a wastegate arranged to allow exhaust gas to bypass the exhaust gas turbine, wherein the internal combustion engine system is configured to allow operational deactivation of one or more cylinders while one or more cylinders are operationally active; and a control circuitry configured to perform the steps of the method according to above.

In an embodiment the system comprises a temperature sensor arranged in association with the exhaust gas aftertreatment system.

In an embodiment the system comprises a controllable drive unit operatively connected to the gas feeding device for driving thereof.

In an embodiment the drive unit is an electric motor.

In an embodiment the system comprises a high pressure EGR system comprising a first EGR conduit configured to allow recirculation of exhaust gas from the exhaust system upstream the exhaust gas turbine to the intake system downstream the gas feeding device.

In an embodiment the system comprises a second EGR conduit arranged to connect the exhaust gas system to the intake system upstream of the gas feeding device and downstream of the turbocharging compressor.

In an embodiment the system comprises one or more EGR valves configured to, depending on a setting of said one or more EGR valves, direct the EGR flow through the first EGR conduit to the intake system downstream the gas feeding device or through the second EGR conduit to the intake system upstream of the gas feeding device and downstream of the turbocharging compressor.

In an embodiment the gas feeding device is a positive displacement machine, preferably a rotary roots type blower having a pair of rotary members provided with meshing lobes.

In an embodiment the gas feeding device comprises at least one rotary member operatively connected to the drive unit.

The invention also relates to a vehicle comprising an internal combustion engine system arranged to power propulsion of the vehicle, wherein the internal combustion engine system is arranged according to above.

The invention also relates to:

A computer program comprising program code means for performing the steps of the method above when said program is run on a computer.

A computer readable medium carrying a computer program comprising program code means for performing the steps of the method above when said program product is run on a computer.

A control circuitry for controlling an internal combustion engine system of the above type, the control circuitry being configured to perform the steps of the method according to above.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
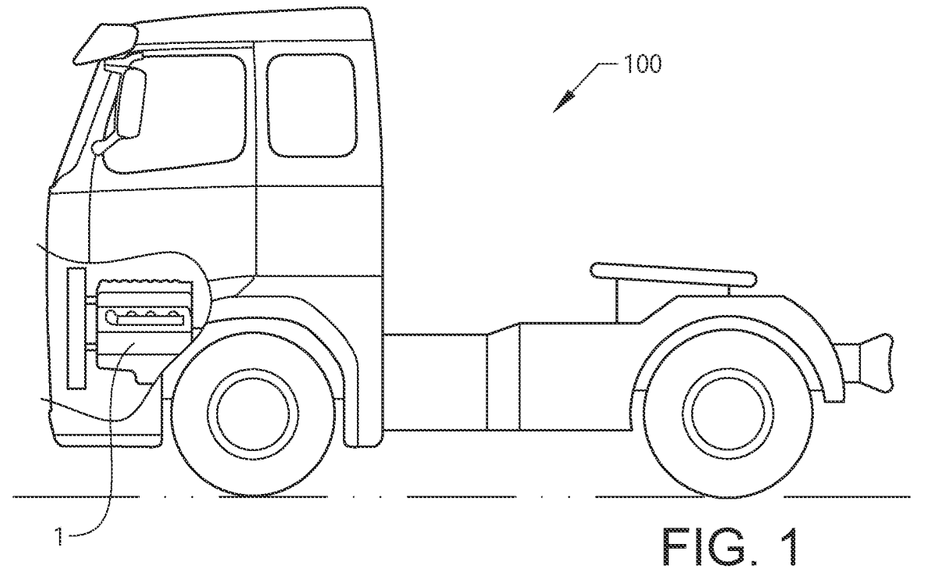
FIG. 1 is a schematic view of a truck provided with an example of an internal combustion engine system according to the invention.

FIG. 1 shows a schematic view of a truck 100 provided with an internal combustion engine system 1 according to the invention.

Figure 2A:
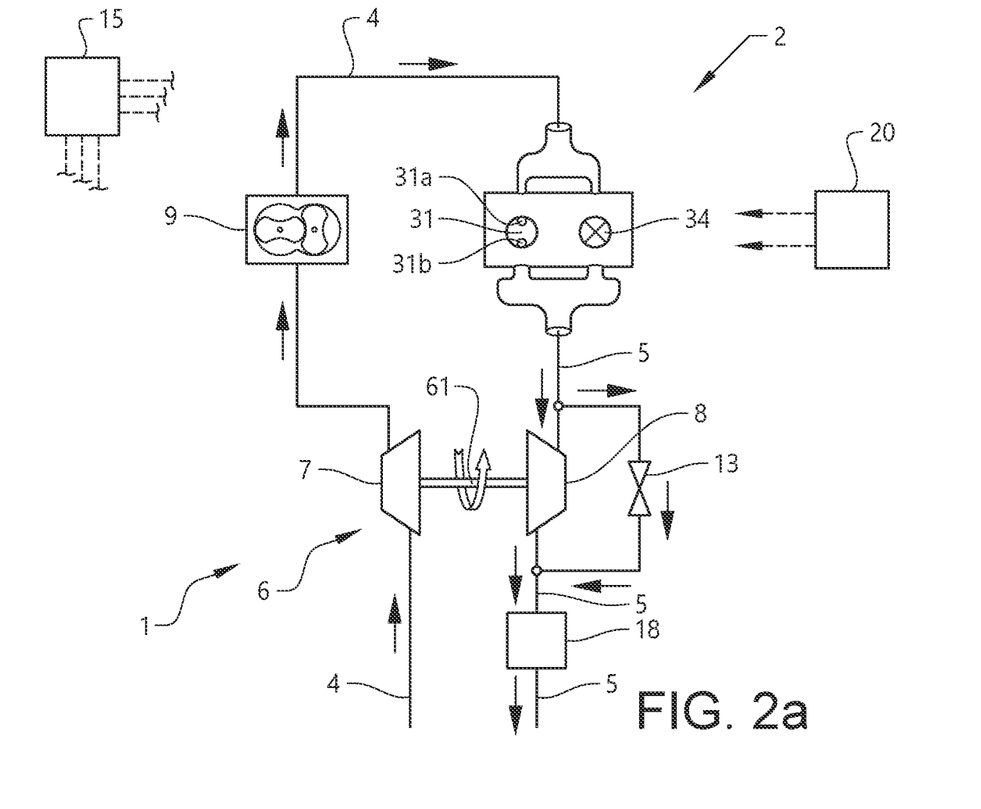
FIG. 2A is a schematic view of a first embodiment of the internal combustion engine system according to FIG. 1.

FIG. 2A shows a schematic view of a first, rather general embodiment of the internal combustion engine system 1 according to FIG. 1. The exemplified engine system 1 in FIG. 2A comprises an internal combustion engine 2 provided with first and second cylinders 31, 34, each of which being provided with an air inlet valve 31a and an exhaust gas valve 31b (indicated only for the first cylinder 31). In a conventional way, each cylinder 31, 34 is further provided with a reciprocally moving piston (not shown) operatively connected to a crankshaft (not shown) of the engine 2.

The engine system 1 further comprises a fuel supply system (indicated with box 20) configured to supply fuel to the cylinders 31, 34; an air intake system 4 and an exhaust gas system 5; a turbocharging arrangement 6 comprising an intake air compressor 7 arranged in the air intake system 4 and an exhaust gas turbine 8 arranged in the exhaust gas system 5, wherein the intake air compressor 7 is operatively connected via shaft 61 to the exhaust gas turbine 8; a controllable gas feeding device 9 exemplified as a Roots blower positive displacement machine (see FIG. 3) arranged in the air intake system 4 downstream the intake air compressor 7; an exhaust gas aftertreatment system (EATS) 18 arranged downstream the exhaust gas turbine 8; and a wastegate 13 arranged to allow exhaust gas to bypass the exhaust gas turbine 8.

The EATS 18 contains catalytic converters and similar components for treating the exhaust gas and these components need to have a sufficiently high temperature to function as intended. At cold-start of the engine system 1 or if the engine system 1 has been operated in a low-load mode for some time, the temperature of the EATS 18 may be too low for treating the exhaust gas in an appropriate manner.

Further, the internal combustion engine system 1 is provided with a control circuitry 15 configured to send and receive control signals, sensor signals, etc. (indicated by dashed lines) and to control the components and the operation of the engine system including performing the steps of the method described below. The control circuitry 15 is further configured to store and have access to various engine system operation data, to make calculations and predictions, etc. Such control circuitries, which may comprise one or more connected control units, are well known as such.

The internal combustion engine system 1 is, by means of the control circuitry 15, configured to allow operational deactivation of, in this example, one cylinder (the second cylinder 34), while, in this example, one cylinder (the first cylinder 31) is operationally active. The "X" in the second cylinder 34 indicates that this cylinder is deactivated, i.e. no combustion occurs in the second cylinder 34. In this case the second cylinder 34 has been deactivated by (by means of the control circuitry 15) shutting off the fuel supply to the second cylinder 34 and by setting the inlet and exhaust valves of the second cylinder 34 in a closed position (using a not shown variable valve actuation system controlled by the control circuitry 15) so that no air/gas passes through the second cylinder 34 when deactivated.

Figure 2B:
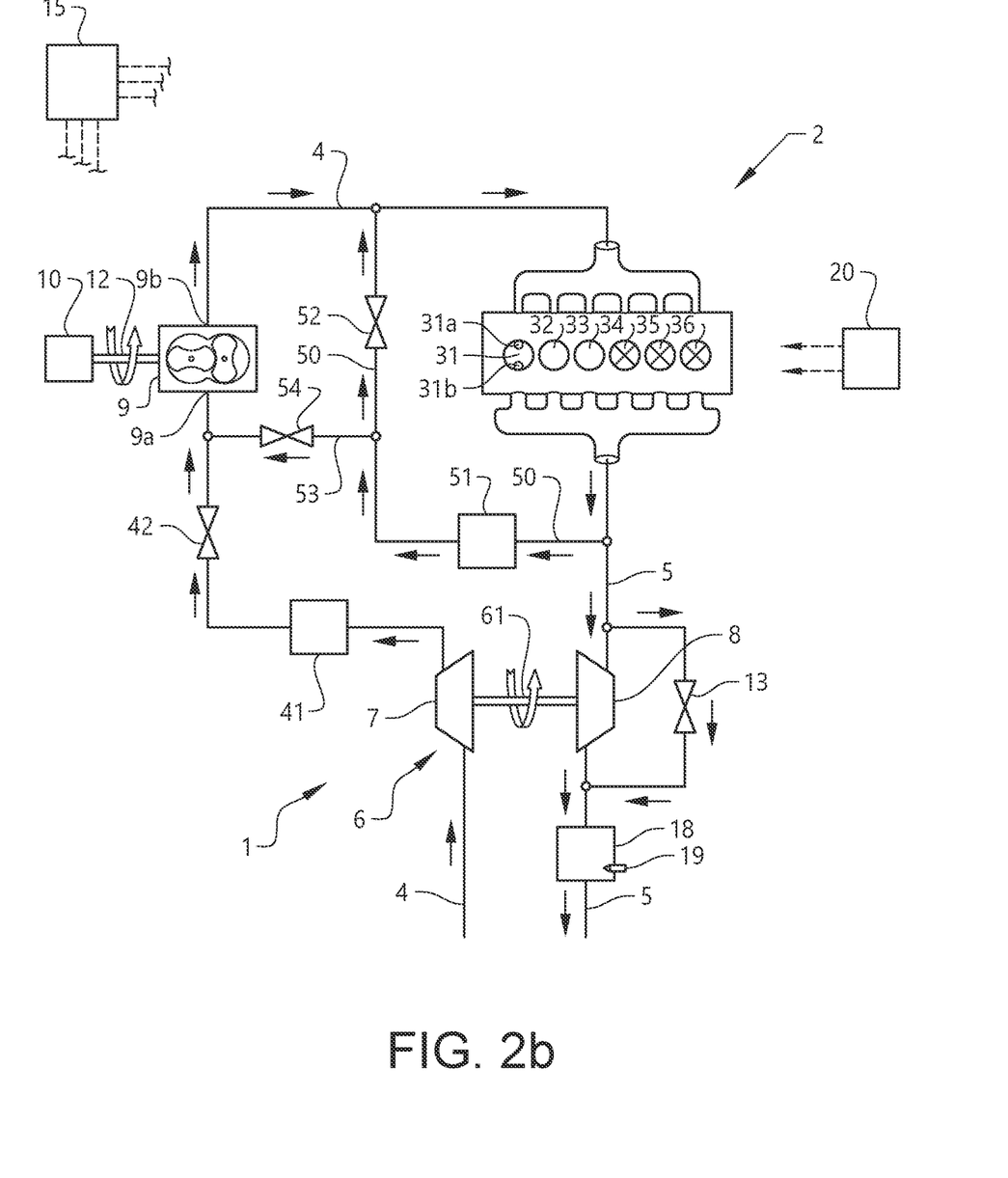
FIG. 2B is a schematic view of a second embodiment of the internal combustion engine system according to FIG. 1.

FIG. 2B shows a schematic view of a second, more detailed embodiment of the internal combustion engine system 1 according to FIG. 1. The exemplified engine system 1 in FIG. 2B comprises the same components and works in the same principal manner as shown in and described in relation to FIG. 2A but includes additional components (all of which can be controlled by the control circuitry 15 in line with what is described above).

The embodiment of FIG. 2B additionally comprises additional cylinders 32, 33, 35, 36 so as to sum up to in total six cylinders of the same type as described above, wherein a first set of cylinders 31-33 are active and a second set of cylinders 34-36 are deactivatable and deactivated as indicated by the "X".

The embodiment of FIG. 2B additionally comprises an air cooler 41 and a throttle valve 42 arranged in the air intake 4 in flow order between the compressor 7 and the gas feeding device/positive displacement machine 9.

The embodiment of FIG. 2B additionally comprises a variable drive unit in the form of an electric motor 10 arranged to drive the positive displacement machine 9 via drive shaft 12 (provided with a not shown free-wheel mechanism allowing the positive displacement machine 9 to rotate freely with the air flow when not used to increase the intake air pressure). The control circuitry is configured to control, for instance, the drive unit 10 so as to control a flow of intake air through the positive displacement machine 9. An inlet 9a and an outlet 9b of the device/machine 9 has been indicated in FIG. 2B.

The embodiment of FIG. 2B additionally comprises an EATS temperature sensor 19 arranged to send its signal to the control circuitry 15. (The sensor 19 can also be seen as a representation of an emission sensor, such as a NOx sensor.)

The embodiment of FIG. 2B additionally comprises a high pressure EGR system comprising a first EGR conduit 50 configured to allow recirculation of exhaust gas from the exhaust system 5 upstream the exhaust gas turbine 8 to the intake system 4 downstream the gas feeding device 9. The EGR conduit 50 is in this case provided with an EGR cooler 51 and a first EGR valve 52.

The EGR system also comprises a second EGR conduit 53 arranged to connect the exhaust gas system 5 to the intake system 4 upstream of the gas feeding device 9 and downstream of the turbocharging compressor 7 (and downstream of the air cooler 41 and the throttle valve 42). In this example the second EGR conduit 53 branches off from the first EGR conduit 50 at a point upstream of (in relation to the EGR flow) the first EGR valve 52. The second EGR conduit 53 is provided with a second EGR valve 54.

Depending on a setting of the first and second EGR valves 52, 54 the EGR flow can be directed through the first EGR conduit 50 to the intake system 4 downstream the gas feeding device 9 or, via an upstream part of the first EGR conduit 50, through the second EGR conduit 53 to the intake system 4 upstream of the gas feeding device 9. (The EGR flow may also be directed both ways simultaneously.)

During normal operation of the engine system 1 with all cylinders 31-36 active the EGR is typically directed only through the first EGR conduit 50 (by closing the second EGR valve 54 and opening the first EGR valve 52), which is in line with conventional engine operation. However, when the gas feeding device/positive displacement machine 9 is used to (additionally) compress the intake air, typically when one or more of the cylinders 34-36 are deactivated and the exhaust gas pressure is reduced, the air pressure downstream the gas feeding device 9 may be higher than the exhaust gas pressure and the air pressure upstream the gas feeding device 9 may be lower than the exhaust gas pressure, and under such conditions the first EGR valve 52 can be closed and the second EGR valve 54 opened so that the EGR flow is directed through the second EGR conduit 53 into the intake system 4 upstream the gas feeding device 9.

Figure 3:
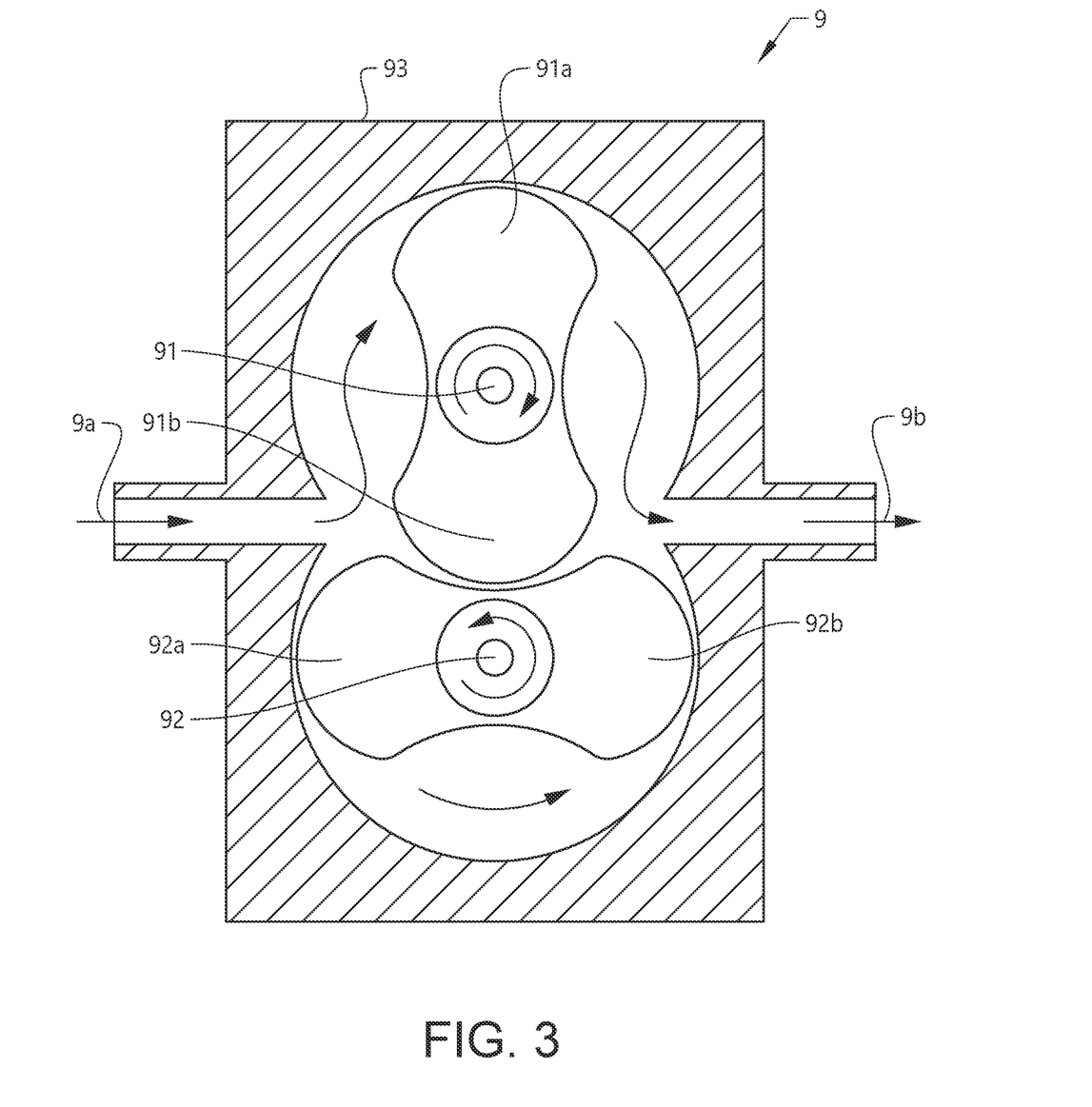
FIG. 3 is a schematic view of a positive displacement machine forming part of the internal combustion engine systems according to FIGS. 2A and 2B.

FIG. 3 shows a schematic view of the gas feeding device/positive displacement machine 9, wherein the positive displacement machine 9 is in the form of a Roots type blower having first and second rotary members 91, 92 provided with meshing lobes 91a, 91b, 92a, 92b configured to rotate inside a surrounding housing 93. Roots type blowers are well known as such. In some Roots type blowers each rotary member is provided with more than two lobes. In relation to FIGS. 2A and 2B an incoming air flow (possibly mixed with the EGR flow as described above) passes the inlet 9a at the left and is displaced (as indicated by the arrows) by the rotary members 91, 92 to the outlet 9b at the right and flows further downstream the cylinders 31-36.

Figure 4:
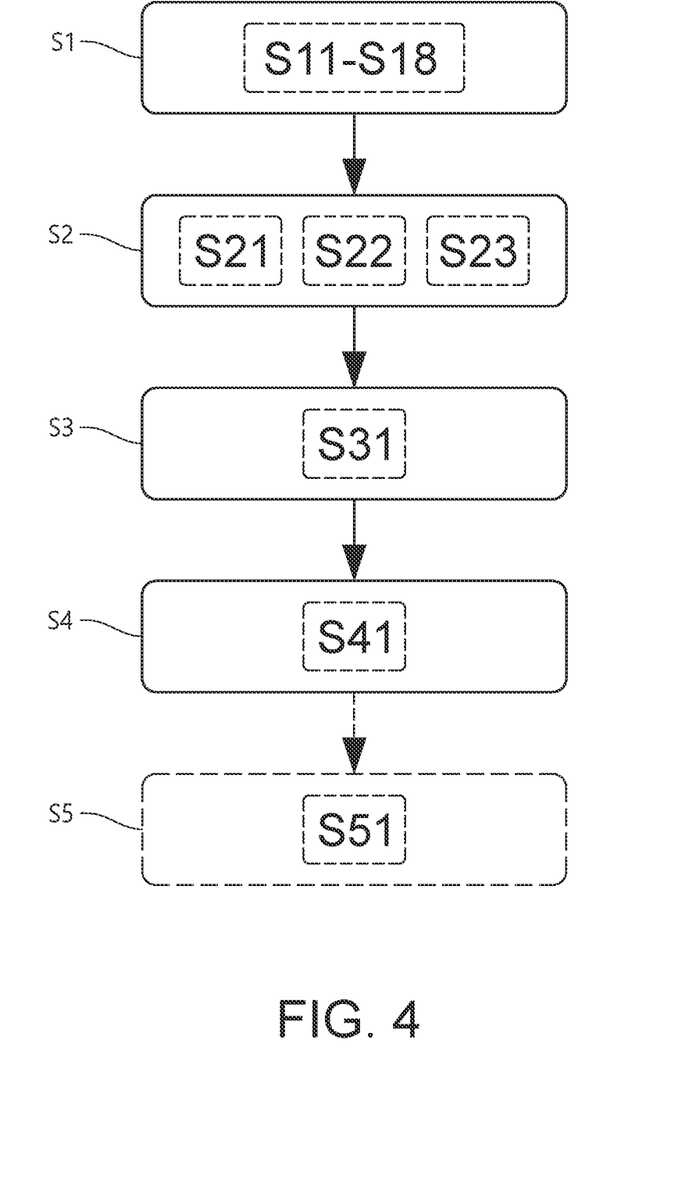
FIG. 4 shows a flow diagram for an example of a method for operating the engine system of FIG. 2.

An example (FIG. 4) of a method of operating the internal combustion engine system 1 comprises the following general steps:

S1—determining whether a functional efficiency of the exhaust gas aftertreatment system 18 is or is about to fall below a threshold value, and when so:

S2—deactivating one or more of the cylinders 34-36;

S3—adapting a drive level of the gas feeding device 9 so as to establish a pressure in the air intake system 4 that is within a range suitable for operating remaining active cylinders 31-33; and S4—opening the wastegate 13 to such a degree that at least 50% of the exhaust gas bypasses the exhaust gas turbine 8.

The steps S1-S4 may in turn comprise sub-steps, and additional steps may be added. Such optional sub-steps and additional steps are indicated by dashed lines in FIG. 4.

Step S1 may comprise one or more of the following steps:

S11—receiving a signal indicative of the functional efficiency of the exhaust gas aftertreatment system;

S12—determining whether said signal is or is about to fall below a signal threshold value;

S13—determining whether a temperature in the exhaust gas aftertreatment system 18 is or is about to fall below a temperature threshold value;

S14 determining whether a degree of exhaust gas conversion in the exhaust gas aftertreatment system 18 is or is about to fall below a conversion threshold value;

S15—obtaining at least a first signal from a temperature sensor 19 arranged in the exhaust gas system 5 downstream the exhaust gas turbine 8;

S16—calculating a current or expected temperature in the exhaust gas aftertreatment system 18;

S17—obtaining at least a first signal from an emission sensor 19 arranged in the exhaust gas aftertreatment system 18 or downstream thereof; and/or S18—calculating a current or expected degree of exhaust gas conversion in the exhaust gas aftertreatment system 18.

Step S1 may be based on a combination of measurements and calculations.

Step S2 may comprise the step(s) of:

S21—shutting off the supply of fuel to the one or more cylinders 34-36 to be deactivated, and/or S22—preventing intake air from flowing through the one or more cylinders 34-33 to be deactivated.

Step S22 may in turn comprise the step of:

S23—keeping the inlet and/or exhaust valves of the one or more deactivated cylinders 34-36 closed.

Step S3 may comprise the step of:

S31—adapting a drive level of the drive unit 10 arranged to drive the gas feeding device 9.

Step S4 may comprise the step of:

S41—opening the wastegate to such a degree that at least 70%, preferably at least 90%, of the exhaust gas bypasses the exhaust gas turbine.

The method may additionally comprise the step of:

S5—redirecting the EGR flow in the first EGR conduit 50 from the exhaust system 5 to a position in the intake system 4 upstream of the gas feeding device 9 and downstream of the turbocharging compressor 7.

Step S5 may comprise the step of:

S51—controlling the first and second EGR valves 52, 54 so as to direct the EGR flow through the second EGR conduit 53 arranged to connect the exhaust gas system 5 via the first EGR conduit 50 to the intake system 4 upstream of the gas feeding device 9 and downstream of the turbocharging compressor 7.

The method steps do not necessarily have to carried out exactly in the order indicated above, and some method steps may be carried out simultaneously.

It is to be understood that the present invention is not limited to the embodiments described above and illustrated in the drawings; rather, the skilled person will recognize that many changes and modifications may be made within the scope of the appended claims.

The invention claimed is:

1. A method for operating an internal combustion engine system comprising:
    an internal combustion engine provided with a plurality of cylinders, each of which being provided with an air inlet valve and an exhaust gas valve;
    a fuel supply system configured to supply fuel to the cylinders;
    an air intake system and an exhaust gas system;
    a turbocharging arrangement comprising an intake air compressor arranged in the air intake system and an exhaust gas turbine arranged in the exhaust gas system, wherein the intake air compressor is operatively connected to the exhaust gas turbine;
    a controllable gas feeding device arranged in the air intake system downstream the intake air compressor, wherein the controllable gas feeding device is a positive displacement machine;
    an exhaust gas aftertreatment system arranged downstream the exhaust gas turbine; and
    a wastegate arranged to allow exhaust gas to bypass the exhaust gas turbine,
wherein the internal combustion engine system is configured to allow operational deactivation of one or more cylinders while one or more cylinders are operationally active;
characterized in that the method comprises the steps of:
    determining whether a functional efficiency of the exhaust gas aftertreatment system is or is about to fall below a threshold value, and when so:
    deactivating one or more of the cylinders;
    adapting a drive level of the gas feeding device so as to establish a pressure in the air intake system that is within a range suitable for operating remaining active cylinders; and
    opening the wastegate to such a degree that at least 50% of the exhaust gas bypasses the exhaust gas turbine.

2. The method according to claim 1, wherein the step of determining whether the functional efficiency of the exhaust gas aftertreatment system is or is about to fall below a threshold value comprises the steps of:
    receiving a signal indicative of the functional efficiency of the exhaust gas aftertreatment system, and
    determining whether said signal is or is about to fall below a signal threshold value.

3. The method according to claim 1, wherein the step of determining whether the functional efficiency of the exhaust gas aftertreatment system is or is about to fall below a threshold value comprises the step of:

determining whether a temperature in the exhaust gas aftertreatment system is or is about to fall below a temperature threshold value; and/or determining whether a degree of exhaust gas conversion in the exhaust gas aftertreatment system is or is about to fall below a conversion threshold value.

4. The method according to claim 3, wherein the step of determining whether the temperature in the exhaust gas aftertreatment system is or is about to fall below the temperature threshold value comprises the step of:

obtaining at least a first signal from a temperature sensor arranged in the exhaust gas system downstream the exhaust gas turbine; and/or calculating a current or expected temperature in the exhaust gas aftertreatment system.

5. The method according to claim 3, wherein the step of determining whether the degree of exhaust gas conversion in the exhaust gas aftertreatment system is or is about to fall below the conversion threshold value comprises the step of:

obtaining at least a first signal from an emission sensor arranged in the exhaust gas aftertreatment system or downstream thereof; and/or calculating a current or expected degree of exhaust gas conversion in the exhaust gas aftertreatment system.

6. The method according to claim 1, wherein the step of deactivating one or more of the cylinders comprises the step of:

shutting off the supply of fuel to the one or more cylinders to be deactivated.

7. The method according to claim 1, wherein the step of deactivating one or more of the cylinders comprises the step of:

preventing intake air from flowing through the one or more cylinders to be deactivated.

8. The method according to claim 7, wherein the step of preventing intake air from flowing through the one or more cylinders to be deactivated comprises the step of:

keeping the inlet and/or exhaust valves of the one or more deactivated cylinders closed.

9. The method according to claim 1, wherein the step of adapting a drive level of the gas feeding device so as to establish a pressure in the air intake system that is within a range suitable for operating remaining active cylinders comprises the step of:

adapting a drive level of a drive unit arranged to drive the gas feeding device.

10. The method according to claim 1, wherein the step of opening the wastegate to such a degree that at least 50% of the exhaust gas bypasses the exhaust gas turbine is carried out so that at least 70%, preferably at least 90%, of the exhaust gas bypasses the exhaust gas turbine.

11. The method according to claim 1, wherein the internal combustion engine system comprises a high pressure EGR system comprising a first EGR conduit configured to allow recirculation of exhaust gas from the exhaust system upstream the exhaust gas turbine to the intake system downstream the gas feeding device and wherein the method comprises the step of:

redirecting the EGR flow from the exhaust system to a position in the intake system upstream of the gas feeding device and, preferably, downstream of the turbocharging compressor.

12. The method according to claim 11, wherein the step of redirecting the EGR flow from the exhaust system to a position in the intake system upstream of the gas feeding device and, preferably, downstream of the turbocharging compressor comprises the step of:

controlling one or more valves so as to direct the EGR flow through a second EGR conduit arranged to connect the exhaust gas system, directly or via a part of the first EGR conduit, to the intake system upstream of the gas feeding device and, preferably, downstream of the turbocharging compressor.

13. The method according to claim 1, wherein the gas feeding device is a rotary roots type blower having a pair of rotary members provided with meshing lobes.

14. The method according to claim 9, wherein the gas feeding device comprises at least one rotary member operatively connected to the drive unit, wherein the step of adapting the drive level of the drive unit comprises controlling a rotational speed of the rotary member.

15. An internal combustion engine system comprising:

an internal combustion engine provided with a plurality of cylinders, each of which being provided with an air inlet valve and an exhaust gas valve;

a fuel supply system configured to supply fuel to the cylinders;

an air intake system and an exhaust gas system;

a turbocharging arrangement comprising an intake air compressor arranged in the air intake system and an exhaust gas turbine arranged in the exhaust gas system, wherein the intake air compressor is operatively connected to the exhaust gas turbine;

a controllable gas feeding device arranged in the air intake system downstream the intake air compressor, wherein the controllable gas feeding device is a positive displacement machine;

an exhaust gas aftertreatment system arranged downstream the exhaust gas turbine;

a wastegate arranged to allow exhaust gas to bypass the exhaust gas turbine, wherein the internal combustion engine system is configured to allow operational deactivation of one or more cylinders while one or more cylinders are operationally active; and a control circuitry configured to perform steps comprising:

determining whether a functional efficiency of the exhaust gas aftertreatment system is or is about to fall below a threshold value, and when so:

deactivating one or more of the cylinders;

adapting a drive level of the gas feeding device so as to establish a pressure in the air intake system that is within a range suitable for operating remaining active cylinders; and opening the wastegate to such a degree that at least 50% of the exhaust gas bypasses the exhaust gas turbine.

16. The internal combustion engine system according to claim 15, wherein the system comprises a temperature sensor arranged in association with the exhaust gas aftertreatment system.

17. The internal combustion engine system according to claim 15, wherein the system comprises a controllable drive unit operatively connected to the gas feeding device for driving thereof.

18. The internal combustion engine system according to claim 17, wherein the drive unit is an electric motor.

19. The internal combustion engine system according to claim 15, wherein the system comprises a high pressure EGR system comprising a first EGR conduit configured to allow recirculation of exhaust gas from the exhaust system upstream the exhaust gas turbine to the intake system downstream the gas feeding device.

20. The internal combustion engine system according to claim 19, wherein the system comprises a second EGR conduit arranged to connect the exhaust gas system to the intake system upstream of the gas feeding device and downstream of the turbocharging compressor.

21. The internal combustion engine system according to claim 19, wherein the system comprises one or more EGR valves configured to, depending on a setting of said one or more EGR valves, direct the EGR flow through the first EGR conduit to the intake system downstream the gas feeding device or through the second EGR conduit to the intake system upstream of the gas feeding device and downstream of the turbocharging compressor.

22. The internal combustion engine system according to claim 15, wherein the gas feeding device is a rotary roots type blower having a pair of rotary members provided with meshing lobes.

23. The internal combustion engine system according to claim 17, wherein the gas feeding device comprises at least one rotary member operatively connected to the drive unit.

24. A vehicle comprising an internal combustion engine system arranged to power propulsion of the vehicle, wherein the internal combustion engine system is arranged according to claim 15.

25. A computer readable medium carrying a computer program comprising program code for performing the steps of claim 1 when said computer program is run on a computer.

\* \* \* \* \*